US010805296B2

(12) United States Patent
Higgins et al.

(10) Patent No.: US 10,805,296 B2
(45) Date of Patent: Oct. 13, 2020

(54) SECURE ONLINE GAMING REGISTRATION SYSTEM WITH PRIVACY CONTROLS

(71) Applicant: IGT, Las Vegas, NV (US)

(72) Inventors: Kevin M. Higgins, Reno, NV (US); Erik B. Petersen, Reno, NV (US); Steven G. LeMay, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/517,211

(22) Filed: Jul. 19, 2019

(65) Prior Publication Data
US 2019/0342292 A1 Nov. 7, 2019

Related U.S. Application Data

(60) Continuation of application No. 15/288,448, filed on Oct. 7, 2016, now Pat. No. 10,362,034, which is a division of application No. 13/475,681, filed on May 18, 2012, now Pat. No. 9,465,931.

(51) Int. Cl.
G07F 17/32 (2006.01)
H04L 29/06 (2006.01)
G06F 21/41 (2013.01)
G06F 21/62 (2013.01)

(52) U.S. Cl.
CPC .......... H04L 63/0884 (2013.01); G06F 21/41 (2013.01); G06F 21/6245 (2013.01); G07F 17/3225 (2013.01); G07F 17/3241 (2013.01)

(58) Field of Classification Search
CPC .................................. G06F 17/00; A63F 13/00
See application file for complete search history.

(56) References Cited

U.S. PATENT DOCUMENTS

| 9,002,745 B2 | 4/2015 | Muir et al. |
| 2001/0034237 A1* | 10/2001 | Garahi ............... G07F 17/32 455/456.3 |
| 2001/0054155 A1 | 12/2001 | Hagan et al. |
| 2004/0242322 A1 | 12/2004 | Montagna et al. |

(Continued)

OTHER PUBLICATIONS

"Extended European Search Report", from EP Application No. 13168062.1 (7 pages), dated Oct. 8, 2013.

(Continued)

Primary Examiner — Omkar A Deodhar
Assistant Examiner — Shauna-Kay Hall
(74) Attorney, Agent, or Firm — Neal, Gerber & Eisenberg LLP

(57) ABSTRACT

An online gaming registration system allows online gaming patrons to register once and use this registration to create online gaming accounts with gaming Web sites, thereby avoiding having to show proof of residency, age and other requirements set by regulatory entities multiple times. Residency rules and other requirements vary from one jurisdiction to another and the present invention addresses some of the issues that arise from this. An online gaming Web site receives a login from an online player over the Internet. The site determines that the player has an account with the online gaming site and that the account is linked to an online gaming registration system account. The online gaming site receives claims-based data relating to the online player and accepts the player as verified for online gaming at the gaming Web site.

20 Claims, 4 Drawing Sheets

(56) References Cited

U.S. PATENT DOCUMENTS

| | | |
|---|---|---|
| 2005/0176500 A1 | 8/2005 | Mathews et al. |
| 2005/0181870 A1* | 8/2005 | Nguyen ............. G06Q 20/0855 463/29 |
| 2005/0188212 A1 | 8/2005 | Laferriere et al. |
| 2006/0128460 A1 | 6/2006 | Muir et al. |
| 2006/0253702 A1 | 11/2006 | Lowell et al. |
| 2007/0032288 A1 | 2/2007 | Nelson et al. |
| 2007/0167226 A1* | 7/2007 | Kelly .................. G07F 17/32 463/29 |
| 2008/0171592 A1 | 7/2008 | Doan |
| 2008/0261701 A1 | 10/2008 | Lewin et al. |
| 2009/0203448 A1* | 8/2009 | Lupo .................. G07F 17/32 463/42 |
| 2009/0271847 A1* | 10/2009 | Karjala ............... H04L 63/0807 726/6 |
| 2010/0062838 A1 | 3/2010 | Nguyen et al. |
| 2010/0071056 A1 | 3/2010 | Cheng et al. |
| 2010/0184505 A1 | 7/2010 | Bryson et al. |
| 2011/0281641 A1* | 11/2011 | Weller ................ G07F 17/3255 463/25 |
| 2013/0060618 A1* | 3/2013 | Barton ............... G06Q 20/3223 705/14.23 |
| 2013/0275376 A1 | 10/2013 | Hudlow et al. |

OTHER PUBLICATIONS

Doctorfree, et al., "Security Assertion Markup Language", XP055077997, pp. 1-9, URL:https://en.wikipedia.org/w/index.php?title=Security_Assertion_Markup_Language&oldid=487109937 (retrieved on Sep. 6, 2013), Apr. 13, 2012.

\* cited by examiner

SECURE ONLINE GAMING REGISTRATION SYSTEM WITH PRIVACY CONTROLS

PRIORITY CLAIM

This application is a continuation of, and claims priority to and the benefit of U.S. patent application Ser. No. 15/288,448, which was filed on Oct. 7, 2016, which is a divisional of, and claims priority to and the benefit of U.S. patent application Ser. No. 13/475,681, which was filed on May 18, 2012, now U.S. Pat. No. 9,465,931, which issued on Oct. 11, 2016, the entire contents of both of which are incorporated herein by reference.

BACKGROUND

1. Field of the Invention

The described embodiments relate generally to wager gaming systems and the Internet. More particularly, they relate to registering online gamers in order to abide by local online gaming rules in a secure and trusted manner while maintaining player privacy.

2. Description of the Related Art

Online wager gaming has recently been gaining acceptance from regulatory bodies and is becoming increasingly popular among players in many jurisdictions around the world. It is inevitable that there will be a wide variety of rules and regulations that will be enacted to ensure that players are physically located within a given gaming jurisdiction. With land-based gaming regulations there are many similarities in the rules, but also a significant number of differences. This will likely also be the case with online gambling rules in the various jurisdictions; that is, there will probably by a lot in common, but also a wide variety of differences. Some jurisdictions may have online player registration requirements that simply require an online background check. For example, in Europe some jurisdictions require that online gamblers provide a tax ID or credit card and have a basic online background check performed. Others may have stricter requirements. For example, an online player may have to prove that she is a resident of the jurisdiction by providing hard copies of original documents and physically appearing at a registration venue or office. For example, she may be required to physically go to a sheriff's office or a casino, provide an ID and even fund an online wagering account in person.

These disparate requirements for registration in different jurisdictions may make it difficult for online gamblers to register for each online gaming site separately. It would be desirable to have a system that can process and manage diverse registration requirements for online gaming. This would allow the game developer and casino operator to focus on games and essentially outsource the registration requirement segment (potentially involving knowledge of many different rules and requirements) to a third party. Furthermore, some of the game developers or casino operators may not have a physical site (i.e., a brick and mortar casino), yet some jurisdictions may require that players come to a physical casino and register. In these cases, the game developers (online gaming operators) can use the facilities of the third party as a registration venue. Other possibilities include allowing registration of prospective online players at a sheriff's office or other governmental office. It would be desirable to have a system which is trusted by online gaming providers within a jurisdiction to register players.

BRIEF SUMMARY

One aspect of the present invention is a method of operating an online gaming Web site. The Web site receives or detects a login attempt from an online player over the Internet. The site determines that the player has an account with the online gaming site and that it is linked to an online gaming registration system account. The online gaming site receives claims-based data relating to the online player and accepts the player as verified for online gaming at the gaming Web site. In this manner, a player does not provide direct proof of residency in the jurisdiction of the online gaming Web site to enable online gaming and play anonymously at the online site if desired.

Another aspect of the present invention is a method of registering an online gaming patron with an online gaming registration system used by gaming Web sites. The patron sends proof that the patron lives within a specific jurisdiction to the gaming registration system. This may be done via the Internet or in person at a registration venue. The registration system determines that the patron physically resides in the specific jurisdiction. A username and password are set for the patron for use with the registration system. The registration system may then create a registration for the patron which can be used by gambling Web sites. These sites trust the gaming registration system with respect to ensuring that the patron is abiding by certain online gaming regulations for the specific jurisdiction.

Another aspect of the present invention is a method of registering a new player at an online gaming Web site (as opposed to an online gambling registration site). The online gaming site receives player data relating to the new player, for example, from a gambling registration system. An online gaming account is created for the new player. The gaming Web site receives secure claims data relating to the new player from the online gambling registration system. The online gaming account is then linked with a gambling registration system account which was created previously by the new player at the online gambling registration site.

BRIEF DESCRIPTION OF THE SEVERAL VIEWS OF THE DRAWINGS

The embodiments will be readily understood by the following detailed description in conjunction with the accompanying drawings, wherein like reference numerals designate like structural elements, and in which.

DETAILED DESCRIPTION

Figure 1:
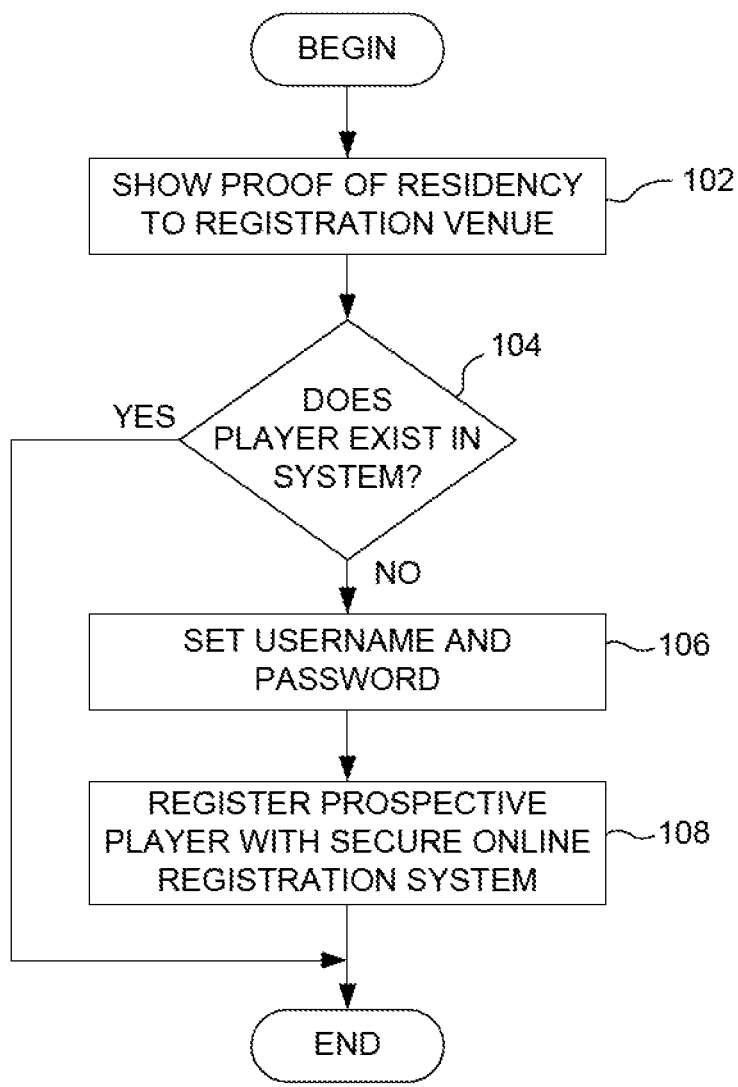
FIG. 1 is a flow diagram of a process of a prospective online player registering with a secure online gaming registration system in accordance with one embodiment.

Methods and systems for implementing an online gaming registration system are described in the various figures. An increasing number of jurisdictions, such as states, provinces, cities, and the like, around the world are allowing its residents to gamble over the Internet. An online gaming site may have one or more physical, brick and mortar offices within a specific jurisdiction. This may range from an office or room with a server to a full-service casino. Alternatively, an online gaming site may not have any physical locations within a given jurisdiction. One of the most prevalent requirements of operating an online gaming site is that the individuals who use it to play wager games must reside in the jurisdiction of the online site. Residency rules and other requirements vary from one jurisdiction to another and the present invention addresses some of the issues that arise from this. A simple example illustrates a typical scenario. If an online gambling site is based in Nevada (e.g., it is operated by a casino in Las Vegas), only residents of Nevada can gamble at that site over the Internet. A player having residence in another state and is not a resident of Nevada is not allowed to login to the site and start gambling even if the player drives across state lines and accesses the site online while physically in Nevada. If she is not a resident of Nevada, she cannot use the Web site for gambling. However, a Nevada resident can go to another state and login to the site and gamble, even though she is not physically in Nevada at the time. A player can be a resident of two or more states; as long as one is Nevada, she can access the site and play online In another example, some jurisdictions may not require actual residency in a jurisdiction, but rather only that the online gambler be physically present when gambling at an online site that is in the same jurisdiction that she is physically in. As such, the online gambler may only have to prove that he is using a computing device that is physically within the jurisdiction in order to satisfy the online gaming requirements. These are a few example scenarios. As online gaming grows, the number of possible scenarios will also grow.

Of course, there are other requirements that individuals must meet in order to gamble online in addition to residency, such as being over a certain age. Other requirements may include having to maintain a certain amount of money in an online account used for placing bets. The present invention allows an individual player to register with an online player registration system within a jurisdiction once and then use that registration to create accounts and login to any number of online gaming Web sites within that jurisdiction (or other allowed or partner jurisdictions as allowed by regulations. An important feature is that the online gaming Web sites trust the registration system, therefore, once the individual registers with the system, as described below, the online gaming sites can use that registration to satisfy their own login and account creation requirements. Alternatively, each site may leverage the registration system to automate the player registration process, but may still require the player to create their own login credentials unique to that site. In this manner, the individual does not have to repeatedly prove residency, age, and the like at each of the gaming Web sites. She can simply rely on her single registration account at the online player registration system which may serve one or more jurisdictions. The advantage to the online gaming Web sites is that they can essentially outsource the online player registration requirements established by regulators and lawmakers in their jurisdiction (presumably not their area of expertise) and, instead, focus on driving the best online gambling experience for their users.

As described below, the primary factor that allows for leveraging a central player registration system within a jurisdiction is establishing trust among the parties, particularly between the service provider operating and maintaining the online player registration system and the online gaming Web site operators. The regulators (e.g., a gaming control board) have to trust both the service provider and the integrity of its registration system and the operators of the online gaming Web sites. As noted above, these operators may be established brick-and-mortar (land-based) casinos that have had long relationships with the regulators or they may be start-ups or new businesses in the jurisdiction whose gambling operations are solely online In another embodiment, the regulatory body in a jurisdiction may also play the role of the service provider and operate and maintain a registration system. In this scenario, there are essentially only two main parties, the regulator/service provider and the online gaming Web site operators.

In addition to the advantages enjoyed by online gamblers and operators noted above, the online gaming registration system also enables integration with land-based player registration requirements. In some jurisdictions, patrons at a casino must be registered with the casino before they can gamble there (e.g., they have to present a registration card before they can enter the casino floor). The gaming registration system of the present invention can be used by gaming operators to manage and implement any land-based player registration requirements, essentially allowing the casinos to outsource this aspect of their operations to a trusted third-party provider. Alternatively, the casino's existing player registration systems may be integrated with the gaming registration system to offer a seamless online and land player registration process. Another advantage is that the system facilitates inspection or approval of online gaming registration in a jurisdiction since each online gambler's registration is consistently formatted, stored in a central repository, and easily made accessible to the regulator by the service provider. Other advantages include providing a centralized storage for player preferences, which may include responsible gaming preferences for individual gamblers. As will be evident the registration system provides a streamlined online player registration process which online gaming Web sites within a gaming jurisdiction can take advantage of.

The online gaming registration system also minimizes revealing personal information or, more specifically, information that can be used to identify an individual, to the online gaming sites. This enables a way for the online player to provide all the personal information necessary to meet the online gaming regulations, but still maintain a certain degree of anonymity in the eyes of the online gaming site operator. The operator trusts the online registration system service provider and so the operator is told that the online player meets all the requirements for online gaming in that jurisdiction and that may be the only information the online site needs to know. The service provider may have or require more information about the online player, but it is possible to keep some or most of the personally identifying information about the gambler from the online gaming site operator, thereby supporting anonymous play. This ability to play with some degree of anonymity is very important to a key group of gamblers. The amount of information that can be kept from the operator can be set based on player preferences.

FIG. 1 is a flow diagram of a process of an online player registering with a secure online gaming registration system in accordance with one embodiment. The registration system may be operated and managed by a gaming equipment manufacturer, such as IGT, Inc. of Reno, Nev., referred to herein as "service provider," which offers the player registration service to multiple gaming operators within a given jurisdiction. It may also be operated by a governmental agency, such as a gaming control board. It may also be operated by a casino to handle that casino's online gambling requirements and offered as a service to other casinos and gaming operators in the jurisdiction (in this scenario the casino is the service provider). For the purposes of illustrating one embodiment, the service provider has a venue or physical location where an individual can go to register with the system. As noted, this may be a casino or a service provider office. It may also be a law enforcement agency, such as a police station or sheriff's office. In some jurisdictions it may be a gaming regulator's office or premises. In other embodiments, a physical venue may not be required and the registration process can be done online However, for the described embodiments, it is assumed that an individual goes to a physical venue to begin the registration process.

At step 102 a prospective online player shows proof of residency to a service provider at a particular venue. The gambler may also have to show proof of age and other personal information and may be required to deposit money into an account or online wallet, described below. In one embodiment, an online player may show residency by appearing in person at a registration site or venue and showing a driver license. In other embodiments, the person may have to show multiple documents showing residency, such as a utility bill or similar document. Regulations may require that the gambler physically appear before the registration entity and present original documents. In other embodiments, the regulations may not be as stringent and a prospective player may be able to show residency by presenting a driver license number or a credit card number to the service provider by entering it online The service provider can then use the number to determine an address of the gambler and accept that as a residence address. In other embodiments, the registration entity can use the driver license number to check the DMV or other appropriate government agency to see what the person's current address is. In yet other embodiments, the registration entity can use the IP address of the computer that the person is using to register and obtain a geographic location of the computer. Although this would not provide residency information, it may be used as one data point in the overall decision-making process of whether to register a prospective player. The various embodiments for determining residency, age, and other requirements can vary widely depending on the regulations of the gaming jurisdiction. The relevant point being that the system and processes of the present invention are able to manage and implement frameworks for the wide range of requirements, so that the online gaming operators do not have to and that the system minimizes the number of times the online player has to register within a jurisdiction with strict registration requirements.

Once the prospective player has shown proof of residency at step 102, the secure online registration system checks to see if the person already exists in the database. In one embodiment, the system does not allow for multiple accounts for the same person in the same jurisdiction. In another embodiment, the same person cannot have more than one resident address across multiple gaming jurisdictions. In other embodiments, the same person may have more than one resident address, but not within the same gaming jurisdiction. However, generally, an individual can only have one account (one residency address) in the system. This is checked at step 104. If the person already has an account or registration, then the process is over and the person is either told by the service provider that he already has a registration or is informed online at step 102 (this will depend on regulations in the gaming jurisdiction).

If the person does not have a registration, control goes to step 106 where he can set a user name and password for his new registration. In other embodiments, the registration entity assigns an initial user name and password and the individual can later change them. The online player will use this user name and password later whenever he needs to verify his residency at an online gaming site, as described below. At step 108 the online player is registered with the registration. This may normally involve creating a record which has his residency information, his birth date, aliases, privacy settings, preferences, responsible gaming parameters, online "wallet" data, such as amount deposited, minimum balance, and the like. In one embodiment, privacy settings determine what information about the online player is disclosed by the registration system to one or more online gambling sites. An online player can elect to make every setting visible or may restrict access to personally identifiable information, in which case the online site will only know the player by a unique ID. In another example, the player may be known by a unique random ID each time they play at an online casino in order to offer the highest level of anonymity. As described below, some of this information may be used to create, in one embodiment, a claims-based token associated with the online player. At this stage the process of creating a registration for the online player is complete.

Figure 2:
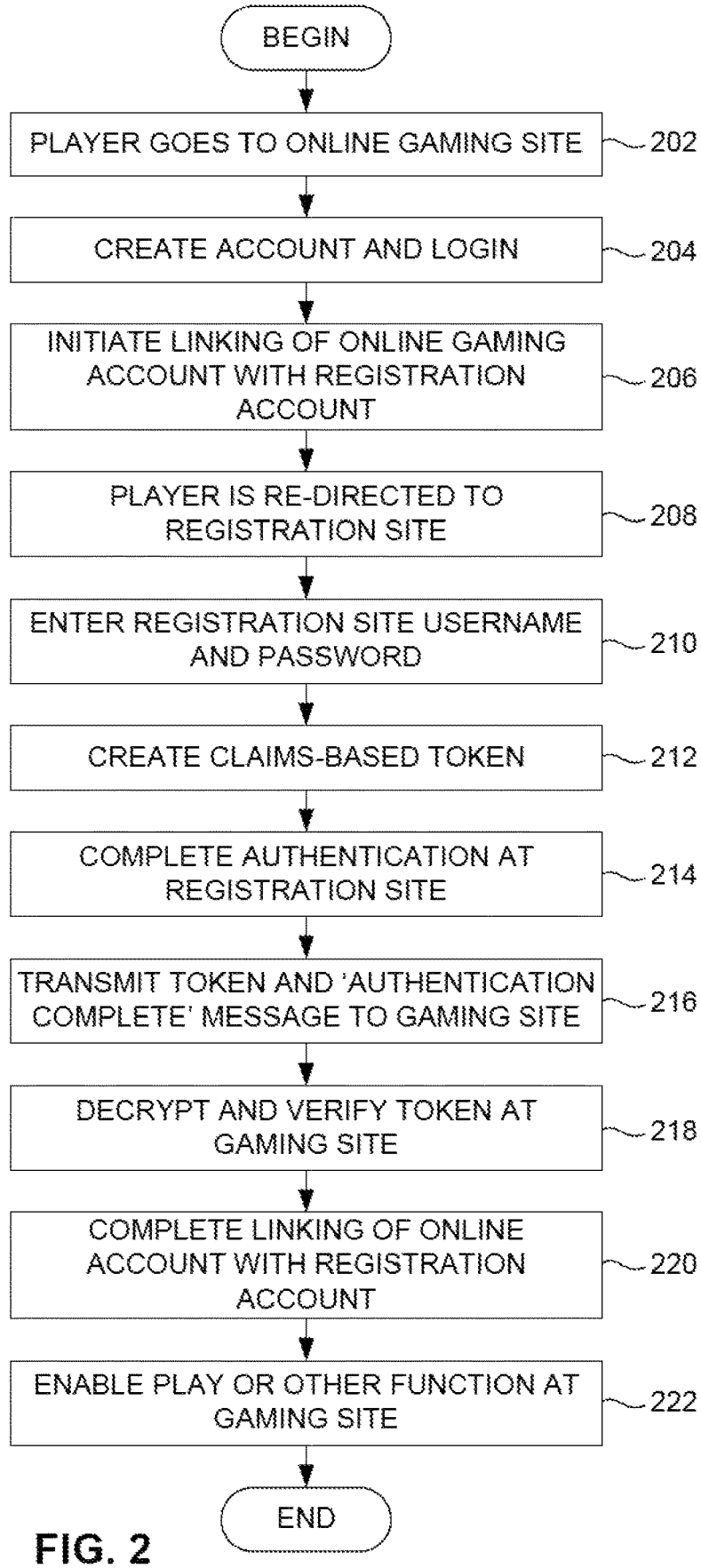
FIG. 2 is a flow diagram of processes that occur at the online gambling site in accordance with one embodiment.

FIG. 2 is a flow diagram of processes that occur at the online gaming site in accordance with one embodiment. It assumes that the online player has already registered with the secure registration system and has proved residency, age, and other information. At step 202 the online player goes to a gambling Web site. If she does not have an account with the site, she starts to create one at step 204. It is anticipated that the usual method for a player to interact with both the online gaming site and the secure online registration Web site is through a Web browser, although other presentation technologies may be used, including native smart phone applications, tablet applications, or applications running in dynamic windows displayed on the gaming machine, such as a Service Window available on gaming machines supplied by IGT.

At step 206, the gambling Web site initiates a process of linking the gambling Web site account (started at step 204) with the secure online registration account created in FIG. 1. It is in this manner, through the linking process, that the gaming Web site verifies data of the online player, specifically the player's residency and age. The linking of the two accounts satisfies the jurisdictional gaming regulations because of the trust that exists between the two entities.

At step 208 the browser redirects the online player to the secure online registration Web site. This is done using known techniques in the art. Once the browser has been re-directed to the registration site, at step 210 the online player enters his user name and password (initially assigned at step 106). By successfully logging into the registration system Web site, the online player has taken the first step in proving his residency to the gaming Web site. Once the online player has logged into the registration system, in one embodiment, the system creates a claims-based token. In another embodiment, it may create a security or access token. Before describing a token and sample implementations, it is important to note that the security model of the online registration system of the present invention is a critical aspect in gaining the trust of all the entities involved. This high degree of trust can be obtained through one or more methodologies. One is the use of Public Key Infrastructure (PM) and through the use of a claims-based identity system. Another methodology, that may be more practical to implement in some configurations, is to use treat the token as a security token and allow the online gaming site access to player preferences using an API together with the token. In this embodiment, the token is effectively an access token.

At step 212 the online registration system creates the claims-based token. In one embodiment, this token may be based on a common claims-based identity protocol, such as SAMLv2, OAuth or other appropriate protocols, or it may be an access token that is leveraged by the online gaming site to gain access to use an API to read information about the player. In the embodiment of a claims-based token, the token is created using data in the gambler's registration account, which may include gaming preferences, personal information, responsible gaming parameters, account information, and so on. As noted, this same data could also be accessed using an API and an access token if a claims-based token is not used. The idea is that the claims-based token, or API returning data about the player, uniquely identifies the online player and when received by the online gaming site, either directly confirms his residency, age, and other requirements, or allows the online site to access that information through an API. The token may be created using one of various protocols and, as such, may use techniques known in the art. As noted, the token may contain a significant amount of personal and confidential information about the online player which must be transmitted securely and kept confidential by the gaming Web site, as discussed below.

In one embodiment, a claims-based token, or an API called by the online gambling web site using an access token obtained after the player authenticates, returns the following information: whether a player is jurisdictionally verified using residency and age requirements for the jurisdiction; age; legal name; birthdate; responsible gaming parameters; wallet/source of funds information; and miscellaneous personal information required per jurisdiction or for business functionality.

At step 214 the online player completes authentication at the registration Web site at which point one or more security provisions are implemented. In one embodiment, the token is digitally signed by the service provider at the registration site before it is transmitted. The service provider can sign the token using a private key of the service provider. In another embodiment, the token may be signed using a secret key if the registration site and the gambling site are using a shared secret. As known in the art, this signature is used to ensure that the token has not been tampered with during transmission and that the token received at the gambling Web site is in fact a token sent by the registration site, as described in step 218.

Another level of security involves maintaining the confidentiality of the actual data in a claims-based token. In one embodiment, the online gaming site has its own public/private key pair. This is useful if the player authenticates herself to the registration system using a claims-based token mechanism or authentication protocol. These protocols, such as SAMLv2 and OpenID, use the player's (end-user's) browser as the mechanism to pass data between two systems, in this case the registration system site and the gaming site. If the registration system returns, for example, a SAML token describing a player's account to the Web browser, it is then included in an HTTP POST or GET sent to the gaming site by the gambler's browser. At this point, the information in the SAML token is available on the gambler's browser and could be disclosed to viruses, malware, or passed to unauthorized third-parties. This vulnerability can be avoided if the registration system site encrypts sensitive data in the SAML token using the gaming Web site's public key. Other security models may also be implemented depending on business and jurisdictional needs, such as including claims signed by regulators or state agencies indicating that a gambler registration was approved by regulators.

At step 216 the secure online registration site transmits a message indicating that the player authentication is complete and also transmits the encrypted and digitally signed token to the gaming Web site. In other embodiments, only the token is transmitted and the transmission implies that the gambler authentication was successful. At step 218 the token is received at the gaming Web site. There the signature of the token is verified by ensuring that it was signed by the private key of the registration site (again, which the gambling site trusts) using the site's public key (or secret key if using a shared secret). Once that is done, the gambling site decrypts the information in the claims-based token that was encrypted at the registration site. This may be all of the information or some of it.

At step 220 any remaining operations that may be needed are taken to complete the linking of the online gaming account with the registration account. In some cases, after the verifying and decrypting described in step 218, the linking process is complete. Now that the linking is complete and the player's residency, age, and other requirements have been met to the satisfaction of the gaming Web site, the site can now proceed with dealing directly with the online player. That is, the online gaming site accepts the player as verified to play in that jurisdiction. At step 222 the site determines whether to enable game play on the site by the online player based on various factors, such as responsible gaming parameters (including self-exclusion), amount and source of funds, and the like. In another embodiment, it may establish a local account linking the properties obtained from the registration system. In most typical cases, the site will simply enable immediate game play for the online player.

Figure 3:
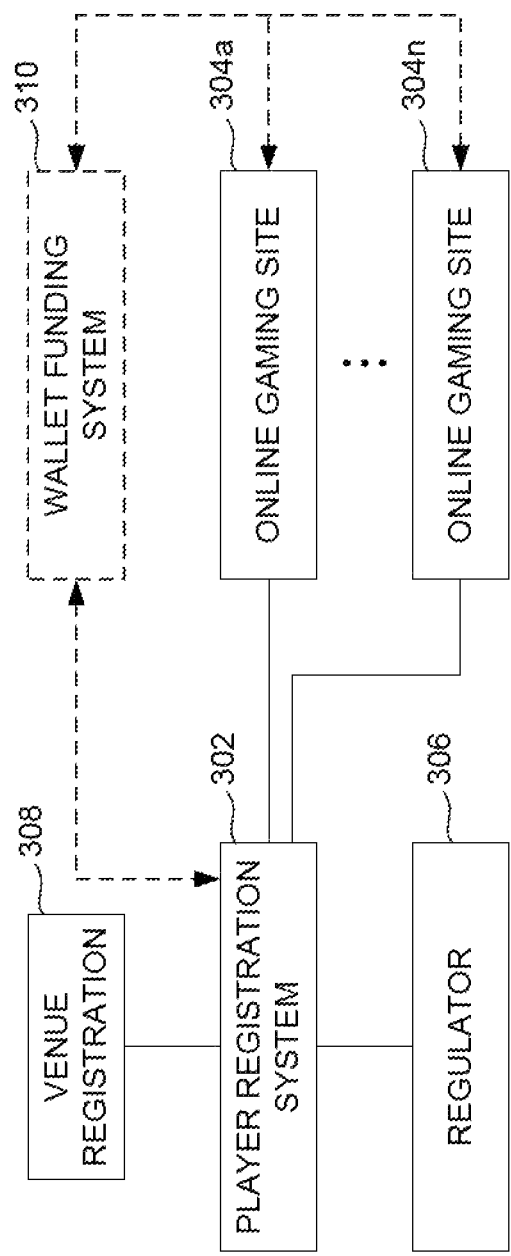
FIG. 3 is a block diagram showing various components for secure online player registration as described in the flow diagrams above in accordance with one embodiment.

FIG. 3 is a block diagram showing various components for secure online player registration as described in the flow diagrams above in accordance with one embodiment. Many have been described above with respect to the processes. Two primary systems or entities in FIG. 3 are the secure online registration system/site 302. As noted above, this may be operated by a third-party service provider, such as IGT, Inc. of Reno, Nev. Registration system 302 is in communication with numerous online gaming Web sites 304a-304n. As described in detail above, the account linking process occurs between these two entities. Registration system 302 can have a high volume of communications between it and numerous gaming Web sites where each site can have hundreds of online gamblers attempting to login to their accounts or are creating new accounts. These operations require at least some two-way communication between the sites. In some cases this communication and any ancillary verification may be extensive (relatively "thick") depending on the jurisdictional requirements.

Another important party or entity in FIG. 3 is regulator 306, such as a gaming commission or gaming control board. In one embodiment, this entity is in communication with the registration system. It will likely play a role in approving registrations and may also assume a monitoring function as well. The degree of involvement of regulator 306 in the operations of registration system 302 may depend on how strict the online gaming regulations are in the jurisdiction and, equally important, the level of trust between regulator 306 and registration system 302. As noted above, in one embodiment, the regulator may also be the service provider managing the registration system. The regulator may also provide information to the service provider and online gaming sites about players who are blacklisted, prevented from engaging in online gambling due to potential cheating online or in land-based casinos, or otherwise involved in criminal activity that regulators view as removing the privilege of online gambling for that player. This is important given that if each casino has its own registration system, then it will be difficult for regulators to have sufficient control to preventing individuals who are known cheaters or criminals from online gambling.

It is generally expected that in order for the overall system to function efficiently and to the benefit of all parties, the parties must have trustful relationships among them. The trust among registration system 302, gaming sites 304*a-n*, and regulator 306 may be referred to as a circle of trust. Although there is no direct connection (line) from regulator 306 to the gaming Web sites 304, there is still a trust relationship between the two. Regulator 306 must trust that the gaming Web sites are taking appropriate steps to verify and authenticate its online gamblers, which they are doing by utilizing services of the secure, online registration system which is trusted (and in some cases monitored, spot checked, approved etc.) by the regulators.

The other entity involved in the process, as described initially in FIG. 1, is a registration venue 308. There may be multiple venues in a jurisdiction (for illustrative purposes, only one is shown). Registration venue 308 may be a land-based registration office, such as a sheriff's office, a land-based casino (which has an online gambling site), a gaming commission office, or service provider office (i.e., the entity providing registration system 302).

When first signing up with the registration system, the gambler may first be required to appear in person with proof of residency, age, and may be required to fund online accounts. This may all be done at venue registration 308. In one embodiment, it only has a need to communicate with registration system 302. Also shown is online wallet funding system 310 which in some embodiments may be utilized by registration system 302 and gaming sites 304. It enables managing accounts and funds for online gamblers and may be useful in ensuring that minimum balances are maintained (and, if not, that online gambling is blocked), parameters setting daily (or weekly/monthly/etc.) wagering amounts are not exceeded, and the like. In general, registration system 302 and the online gaming sites may effectively outsource most of the online accounting and funding aspects of the system to wallet system 310 and rely on it to maintain online gamblers' accounts. In other embodiments or with the more sophisticated online gaming sites (e.g., those connected to an experienced land-based casino), outsourcing of this responsibility may not be needed given that they may already have highly reliable accounting systems in place.

Registration system 302 may be used in other ways as well. Some have been mentioned or alluded to above, such as storing various patron preferences, including responsible gaming preferences, references to an account in central wallet funding system 310, among others. Although the registration system is well-suited for jurisdictions that require players to register with the state or provincial government, it is also functional for states and other jurisdictions that only require players to first register and fund accounts at land-based casinos. For example, if Nevada had such requirements, players may normally be restricted to gamble at online casinos that they have been able to register with at their land-based counterparts, which may make it difficult for online players to easily move from one online gaming site to another. The registration system of the present invention may allow land/online casino operators to create registration consortiums or groups that provide online gamblers access to a larger number of online gaming sites once the player registers with any land-based casino that is in the consortium. This may be especially useful for smaller, locally based casinos in establishing an online presence by cooperating with other casinos of similar size.

Another possible use is to restrict the release of information that can personally identify an online player. As noted above, some gamblers want to remain anonymous. Presently, in some land-based casinos, around 40% of the gamblers are not members of a loyalty or reward program. These players consciously chose to forgo earning points and rewards on their play in order to remain anonymous. In this configuration, the player registers with the registration system using the process required by the jurisdiction. When the player goes to the online gaming site in the same jurisdiction, the player logs into the site using his previously established online registration system account (created in FIG. 1) and through a user interface on the registration site, instructs the system to not reveal any personally identifying information to the online gaming site. When the player login is complete at the gaming site, the site will only see the player as a unique number, such as a GUID (which may uniquely identify the player for the session or for all time). The token may also contain information describing whether the player is registered in the jurisdiction and other data as described extensively above. This allows a player to gamble online on numerous gaming Web sites, but only require the player to reveal personally identifying information to the secure, online registration system.

Figure 4A:
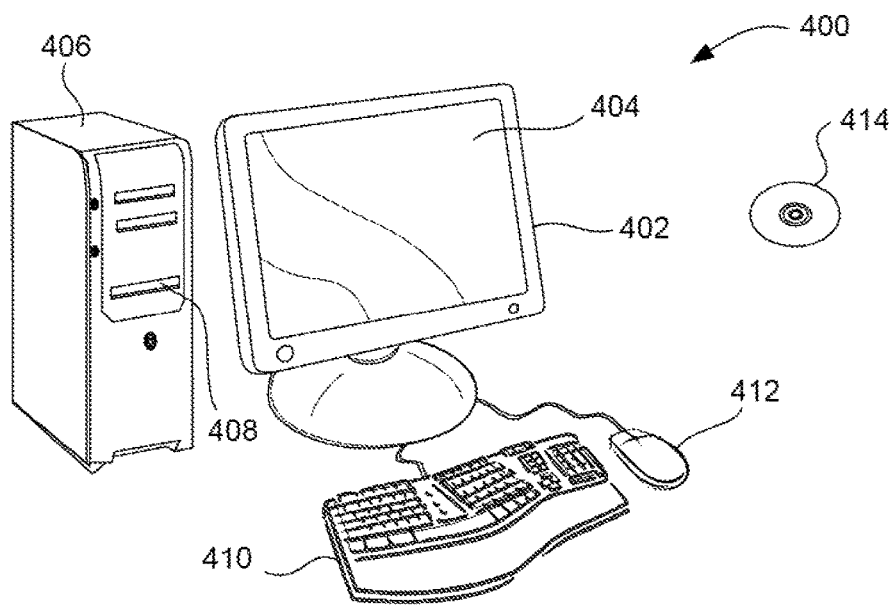
FIGS. 4A and 4B illustrate a computing device suitable for implementing specific embodiments of the present invention.
Figure 4B:
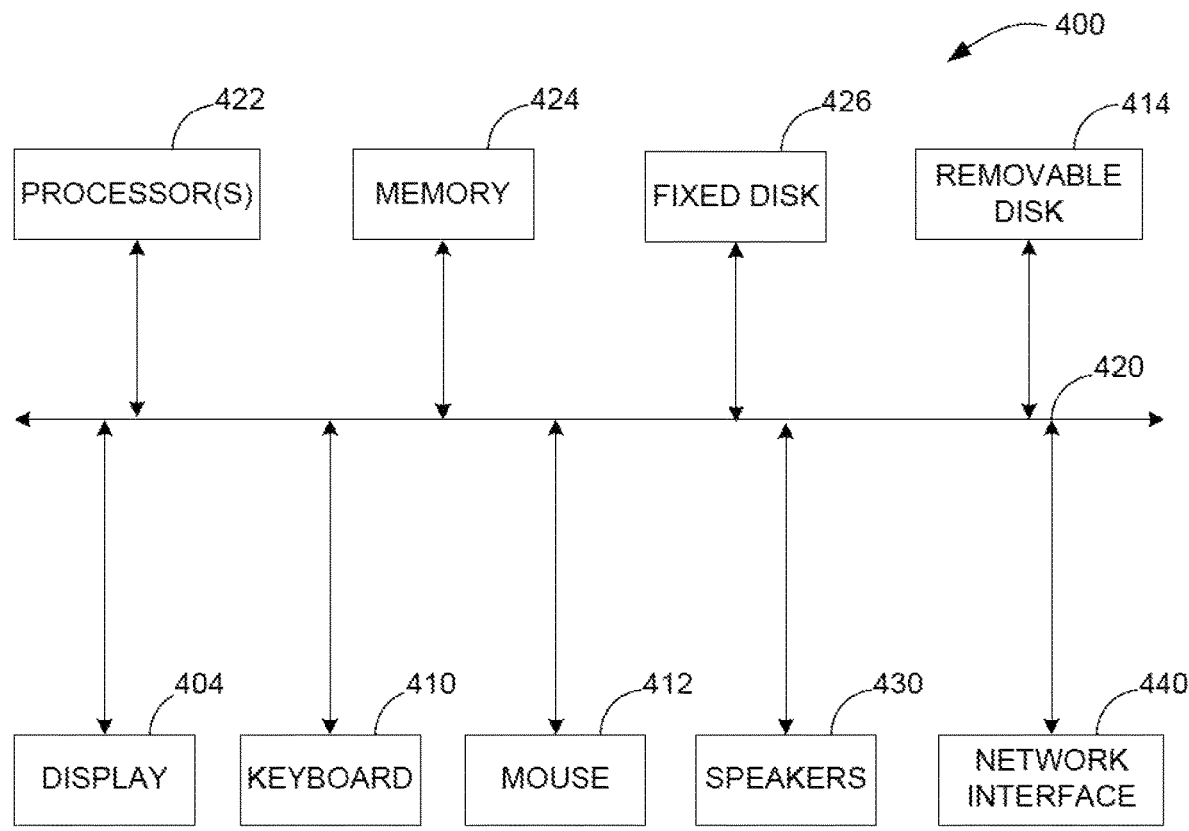

FIGS. 4A and 4B illustrate a computing device 400, such as a personal computer, a server computer, or a tablet device, suitable for implementing specific embodiments of the present invention. FIG. 4A shows one possible physical implementation of a computing system. In one embodiment, system 400 includes a display 404. It may also have a keyboard 410 that is shown on display 404 or may be a physical component that is part of the device housing. It may have various ports such as HDMI, DVI, or USB ports (not shown). Computer-readable media that may be coupled to device 400 may include USB memory devices and various types of memory chips, sticks, and cards.

FIG. 4B is an example of a block diagram for computing system 400. Attached to system bus 420 is a variety of subsystems. Processor(s) 422 are coupled to storage devices including memory 424. Memory 424 may include random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 426 is also coupled bi-directionally to processor 422; it provides additional data storage capacity and may also include any of the computer-readable media described below. Fixed disk 426 may be used to store programs, data and the like and is typically a secondary storage medium that is slower than primary storage. It will be appreciated that the information retained within fixed disk 426, may, in appropriate cases, be incorporated in standard fashion as virtual memory in memory 424.

Processor 422 is also coupled to a variety of input/output devices such as display 404 and network interface 440. In general, an input/output device may be any of: video displays, keyboards, microphones, touch-sensitive displays, tablets, styluses, voice or handwriting recognizers, biometrics readers, or other devices. Processor 422 optionally may be coupled to another computer or telecommunications network using network interface 440. With such a network interface, it is contemplated that the CPU might receive information from the network, or might output information to the network in the course of performing the above-described method steps. Furthermore, method embodiments of the present invention may execute solely upon processor 422 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

The invention is claimed as follows:

1. A system for operating an online gaming Web site, the system comprising:
   a network interface;
   a processor; and
   a memory device that stores instructions that, when executed by the processor, cause the processor to operate with the network interface to:
   receive player data relating to a player;
   create an online gaming account for the player;
   receive secure data relating to the player from a third-party gambler site that maintains an online wallet for the player previously created for the player through the third-party gambler site;
   confirm that the player is authorized to access the online wallet based on the secure data, wherein the secure data uniquely identifies the player and includes encrypted information associated with the player that was previously provided by the player to the third-party gambler site;
   link the online gaming account for the player with the online wallet to transfer player funds from the online wallet to the online gaming Web site for player use of the player funds at the online gaming Web site; and
   update the online gaming account for the player based on the encrypted information in the secure data.

2. The system of claim 1, wherein the secure data relating to the player includes one of a claims-based identity token and an access token.

3. The system of claim 1, wherein the instructions, when executed by the processor, cause the processor to operate with the network interface to redirect the player to the third-party gambler site and receive an authentication-complete message from the third-party gambler site.

4. The system of claim 1, wherein the instructions, when executed by the processor, cause the processor to operate with the network interface to link the online gaming account for the player with the online wallet to transfer player funds from the online gaming Web site to the online wallet.

5. A system for operating a third-party gambler site, the system comprising:
   a network interface;
   a processor; and
   a memory device that stores instructions that, when executed by the processor, cause the processor to operate with the network interface to:
   receive player data relating to a player;
   create a third-party gambler account for the player, the third-party gambler account comprising player information and an online wallet for the player;
   responsive to a request from one of the player and an online gaming Web site, confirm that the player is authorized to access the online wallet and send secure data relating to the player to the online gaming Web site, wherein the secure data uniquely identifies the player and includes encrypted information associated with the player that was previously provided by the player to the third-party gambler site;
   link an online gaming account of the online gaming Web site for the player with the online wallet to transfer player funds from the online wallet to the online gaming Web site for player use of the player funds at the online gaming Web site; and
   update the online gaming account based on the encrypted information in the secure data.

6. The system of claim 5, wherein the secure data relating to the player includes one of a claims-based identity token and an access token.

7. The system of claim 5, wherein the instructions, when executed by the processor, cause the processor to operate with the network interface to link the online gaming account for the player with the online wallet to transfer player funds from the online gaming Web site to the online wallet.

8. The system of claim 5, wherein the instructions, when executed by the processor, cause the processor to operate with the memory device to store data relating to an amount deposited by the player into the online wallet.

9. The system of claim 5, wherein the instructions, when executed by the processor, cause the processor to operate with the memory device to store data relating to a source of funds for funds deposited by the player into the online wallet.

10. The system of claim 5, wherein the instructions, when executed by the processor, cause the processor to operate with the memory device to store data relating to a responsible gaming parameter for the player.

11. The system of claim 5, wherein the instructions, when executed by the processor, cause the processor to operate with the memory device to store data relating to a player preference for the player.

12. The system of claim 5, wherein the instructions, when executed by the processor, cause the processor to operate with the memory device to store data relating to a wagering limit for a time period for the player.

13. The system of claim 5, wherein the online gaming Web site is a first online gaming Web site, and the instructions, when executed by the processor, cause the processor to operate with the network interface to, responsive to a request from one of the player and a second online gaming Web site, confirm that the player is authorized to access the online wallet and send the secure data relating to the player to the second online gaming Web site, wherein the secure data, and link an online gaming account of the second online gaming Web site for the player with the online wallet to transfer player funds from the online wallet to the second online gaming Web site for player use of the player funds at the second online gaming Web site.

14. A system for operating a third-party gambler site, the system comprising:
 a network interface;
 a processor; and
 a memory device that stores instructions that, when executed by the processor, cause the processor to operate with the network interface to:
 receive player data relating to a player;
 create a third-party gambler account for the player, the third-party gambler account comprising player information and an online wallet for the player; and
 for each of a plurality of online gaming Web sites:
 responsive to a request from one of the player and that online gaming Web site, confirm that the player is authorized to access the online wallet and send secure data relating to the player to that online gaming Web site, wherein the secure data uniquely identifies the player and includes encrypted information associated with the player that was previously provided by the player to the third-party gambler site,
 link an online gaming account of that online gaming Web site for the player with the online wallet to transfer player funds from the online wallet to that online gaming Web site for player use of the player funds at that online gaming Web site, wherein the transfer of the player funds is limited by data associated with the online wallet, and
 update the online gaming account based on the encrypted information in the secure data.

15. The system of claim 14, wherein the secure data relating to the player includes one of a claims-based identity token and an access token.

16. The system of claim 14, wherein for each of the plurality of online gaming Web sites, the instructions, when executed by the processor, cause the processor to operate with the network interface to link the online gaming account for the player with the online wallet to transfer player funds from that online gaming Web site to the online wallet.

17. The system of claim 14, wherein the data associated with the online wallet for the player comprises data relating to a responsible gaming parameter for the player.

18. The system of claim 14, wherein the data associated with the online wallet for the player comprises data relating to a player preference.

19. The system of claim 14, wherein the data associated with the online wallet for the player comprises data relating to a wagering limit for a time period for the player.

20. The system of claim 14, wherein the data associated with the online wallet for the player comprises data relating to a privacy setting for the player.

* * * * *